United States Patent Office 3,584,020
Patented June 8, 1971

3,584,020
PREPARATION OF π-ALLYL PALLADIUM COMPLEXES
Hartwig C. Bach, Durham, N.C., assignor to Monsanto Chemical Company, St. Louis, Mo.
No Drawing. Filed July 29, 1968, Ser. No. 748,221
Int. Cl. C07f 15/00
U.S. Cl. 260—429    5 Claims

ABSTRACT OF THE DISCLOSURE

High yields of high purity π-allyl palladium complexes can be obtained through the use of a basic amide solvent such as N,N-dimethylacetamide in which to conduct the reaction of an olefin having an allylic hydrogen atom with a palladium salt of a coordinating anion such as the chloride. The binuclear π-allyl complexes produced may readily be isolated from the equilibrium products optionally by neutralization with ammonia or a tertiary amine.

---

This invention relates to a novel synthesis of chemical intermediates.

More particularly, the instant invention relates to a novel preparation of π-allyl palladium complexes from olefins by reaction with palladium salts of coordinating anions.

π-allyl palladium complexes have been reported in literature and have been found useful as chemical intermediates and as catalysts. The π-allyl palladium complexes prepared as herein described may be represented by the formulas below wherein Formula I represents a mononuclear π-allyl palladium complex and Formula II represents a binuclear π-allyl palladium complex, the products being formed as an equilibrium product.

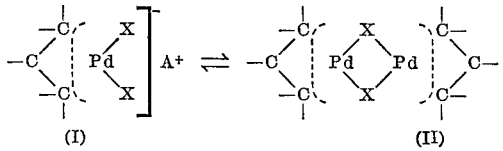

wherein the organic precursor is a compound having an allylic hydrogen

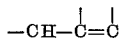

X represents a coordinating anion and A⁺ represents a cation, such as hydrogen, lithium or complexes thereof. When such allylic olefins are complexed as π-allyl ligands with a palladium ion each of the three carbon atoms contributes electrons to the bond between the palladium ion and the π-allyl ligand. This type of electron contribution is believed to result in a much stronger bond than normally found in other organometallic complexes.

Although the complexes prepared by the process of this invention have been prepared by a variety of syntheses, including the reaction of allylic olefins with palladium salts, the π-allyl complexes formed are frequently difficult or practically impossible to isolate and are quite often obtained in low yields. The use of solvents such as acetic acid in the place of the basic amide as a reaction results in decreased yields and difficulty in isolation of the products to the extent that the reactions as such are of little practical use for the preparation of bis(π-allyl palladium) complexes for commercial purposes.

The method of the instant invention involves the reaction of allylic olefins with palladium salts in a basic amide solvent. The novel reaction of this invention has been found to be advantageous because the reactants are generally readily available, the yields are relatively high, if desired, the products can be isolated from the reaction mixture in highly pure form, the reaction mixture itself may be employed for other reactions involving the π-allyl complexes, and generally the reaction periods are short and the conditions necessary to provide desirable results are mild.

The process of this invention is generally represented by the following equations:

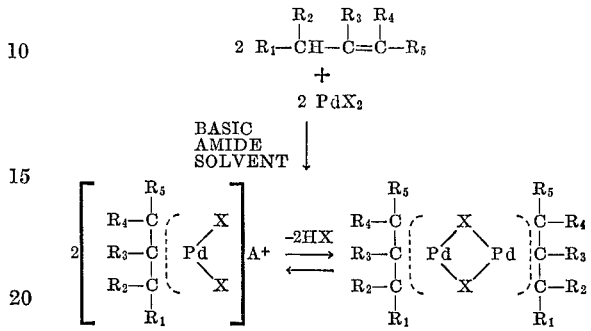

wherein $R_1$, $R_2$, $R_3$, $R_4$ and $R_5$ may be the same or different nonionic aliphatic, alicyclic or aromatic radicals or hydrogen, X represents a coordinating anion such as a halide, acetate, and the like and A⁺ represents a cation or complex thereof.

The product of the above reaction is an equilibrium product which when prepared according to the instant invention can conveniently be shifted to the formation of the binuclear π-allyl palladium complex where isolation of the product is desired. In this respect partial or complete neutralization is conveniently achieved by adding ammonia or a tertiary amine. The degree to which the binuclear π-allyl palladium complex is formed initially without extraneous neutralization of the acidic by-product is somewhat dependent on the allylic reactant and the basicity of the amide solvent employed as the reaction medium. As indicated, ammonia or tertiary amines, such as pyridine, triethyl amine or N-methyl pyrrolidone can be conveniently employed for neutralization in an amount necessary to partially or completely tie-up the protons existing in the reaction system. Additionally, where isolation of the binuclear π-allyl palladium complex product is intended it may be desirable to conduct the reaction in the presence of a neutralizing agent in order to shift the reaction equilibrium to the right during the course of the reaction. The effect of adding ammonia and tertiary amines may otherwise be explained in terms of pH control and it appears that highest yields of the binuclear product are normally achieved at a pH of around 7.

The critical characteristic of the olefin employed in the formation of π-allyl complexes according to this invention is that it possesses an allylic hydrogen atom or, otherwise stated, the organic reactant must have at least one hydrogen atom on a saturated carbon directly adjacent to an olefinically unsaturated carbon atom. Compounds of this type are classic and typically represented by the various straight and branched aliphatic olefins, various unsaturated alicyclic compounds and various alkenyl aromatic, including hydrocarbons such as propene, butene, isobutene, pentene, hexene, cyclohexene, α-methylstyrene, cyclohexene, cyclopentene, 3-methyl butene-1, 3-phenyl butene-1, 3-phenyl propylene, 1,5-hexadiene and the like. Additionally, the allylic reactants may contain various non-ionic substituent groups which are unreactive with palladium salts, such as halides, ethers, esters, ketones, and aldehydes such as 4-chloro-3-methyl butene-1, 3-carbomethoxy propylene, 2-methyl-2-(4-nitrophenyl)ethylene and the like and the term "non-ionic olefin having an allylic hydrogen atom" is herein intended to include such substituents.

The palladium compounds useful in forming π-allyl complexes of this invention are salts of coordinating anions; they include halides, such as chloride, bromide and iodide, carboxylates, such as the acetates, propionates and others known to those skilled in the art. While not essential to the invention the palladium salts employed herein may be used in the form of complexes with other materials. For example, a complex of palladium chloride with benzonitrile or lithium chloride may be employed with the same effect as palladium chloride.

The use of a basic amide solvent results in the advantages above-recited for the preparation of π-allyl palladium complexes. The solvents which may be employed in this invention may be aliphatic, aromatic or heterocyclic in structure and may be represented by the formula

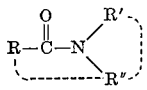

wherein R, R' and R" are radicals selected from the group consisting of H, alkyl, phenyl and R and R" or R' and R" when linked together represent an alkylene radical with the proviso that the sum of R, R' and R" represent less than 12 carbon atoms. These solvents include materials such as acetamide, N-methylbenzamide, N,N-dimethylformamide, N,N-dimethylpropionamide, N-methylpyrrolidone, N-ethylpyrrolidone, hexamethylphosphoramide and the like.

The order of addition of reactants has not been found to constitute a critical aspect of this invention. In one mode, the palladium salt may be dissolved in the basic amide solvent and the olefin thereafter added to the solution. Alternatively, the palladium salt may be added to a saturated basic amide solution of the olefin. In either case the olefin should be employed in at least equimolar concentrations or greater with respect to the palladium salt to insure complete utilization of the more expensive of the two reactants.

The temperatures employed in the practice of this invention depend somewhat upon the result desired and range from about 20° C. up to about 250° C. The reaction proceeds more rapidly at temperatures above 60° C. and where product isolation is desired temperatures for the reaction may range up to the decomposition point of the π-allyl complex, pressure being employed where necessary to maintain the solvent in a liquid state. As temperatures employed in the reaction exceed about 120° C., the equilibrium products begin to decompose, the temperature of decomposition being dependent on the particular reaction system. In the case of the use of palladium chloride as the salt the decomposition products correspond to the halogen substituted analogue of the allylic reactant where the halogen is substituted for the allylic hydrogen atom. Where the reaction temperature is employed above the decomposition point of the π-allyl complex the reaction may be conducted in the presence of an additional reactant which reacts with the allyl ligand of the unstable π-allyl complex preferentially and prior to the formation of its normal heat decomposition product as above indicated. Thus, those skilled in the art will recognize that the temperatures employed in the process within the framework herein disclosed will depend on the use for which the π-allyl complex is formed. It has been observed that the reaction proceeds somewhat more rapidly in the higher temperature range generally without adverse effect on either the yield or purity of the desired product.

As the π-allyl palladium complex is formed portions thereof may precipitate from the reaction mixture and where isolation of the product is desired the reaction mixture may be neutralized as above-indicated to increase the product precipitation, whereupon the product can be filtered and washed with water. If isolation of the product is not desired the volume of the reaction mixture can be increased by use of additional solvent or decreased by removal of solvent under vacuum. The amount of solvent employed has not been found to be critical so long as there is sufficient solvent to at least partially dissolve the reactants and to allow adequate contact between reactants.

In order to minimize side reactions which may have a deleterious effect on both the purity and yield of the product, the reaction should be conducted under essentially anhydrous conditions.

The following examples are provided to further illustrate the invention and are not intended to limit the scope thereof.

EXAMPLE I 1.77 g. (0.01 mole) of PdCl$_2$ was added to 35 ml. of a saturated solution of propylene in DMAc. The mixture was heated under a propylene atmosphere to 90° C. for 1 hr. (propylene absorption: 115 ml.), neutralized at 25° C. with 490 ml. of anhydrous NH$_3$, heated to 70–98° C. for one hour. The resulting yellow-green slurry was filtered and the filtrate was reduced to 4 ml. The product was isolated by coagulation in water. Yield: 0.44 g. (51% based on propylene) of bis-(π-allyl palladium chloride).

EXAMPLE II

Preparation of bis(2-phenyl-π-allyl palladium chloride

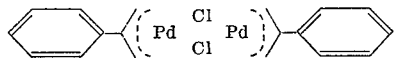

Palladium chloride (0.68 g., 0.00385 mole) and 0.455 g. (0.00385 mole) of α-methyl styrene were added to 10 ml. of N,N-dimethylacetamide. The reaction mixture was heated to 90° C. for 2 hrs. The product was isolated by precipitation of the reaction mixture in 100 ml. of methanol. Yield: 0.39 g.=30% of theory. IR and NMR analyses of the compound were consistent with the proposed structure.

EXAMPLE III

Preparation of bis(3-propyl-π-allyl palladium chloride)

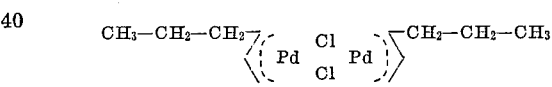

A mixture of 1.58 g. (0.0089 mole) of palladium chloride and 1.5 g. (0.0178 mole) of 1-hexene in 10 ml. of N,N-dimethylformamide was heated to 90° C. for 4 hrs. After cooling, 2 ml. of pyridine was added. The pyridine palladium chloride complex formed was removed by filtration and the filtrate evaporated to dryness. By extraction of the residue with benzene 0.5 g. (25% of theory based on PdCl$_2$ used) of the title compound was obtained. IR and NMR analyses were consistent with the proposed structure.

I claim:

1. A process for the preparation of π-allyl palladium complexes which comprises reacting propene at temperatures between about 20° C. and about 250° C. with a compound selected from the group consisting of palladium acetates in a basic amide solvent of the structure

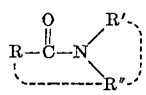

wherein R, R' and R" are selected from the group consisting of hydrogen, alkyl, phenyl and alkylene where either R or R' is linked to R" through covalent carbon to carbon bonds with the proviso that the sum of carbon atoms in R, R' and R" is less than 12.

2. The process of claim 1 wherein the pH of the reaction mixture is adjusted to at least about 7.

3. The process of claim 1 wherein the basic amide solvent is selected from the group consisting of acetamide, N-methylbenzamide, N,N-methylacetamide, N,N-dimethylformamide, N,N - dimethylpropionamide, N- ethyl pyrrolidone, N-methyl pyrrolidone and hexamethylphosphoramide.

4. The process of claim 3 wherein the palladium compound is palladium chloride.

5. The process of claim 1 wherein the solvent is N,N-dimethylacetamide.

References Cited

Morelli et al.: Chem. Commun., 1967, pp. 801–802.

Guy et al.: Advances in Inorg. Chem. and Radiochem., Academic Press, New York, N.Y., vol. 2 (1964) pp.

Gutmann: Coordination Chemistry in Non-Aqueous Solutions, Springer-Verlag, Vienna, 1968, p. 19.

Green et al.: Advances in Organometallic Chemistry, Academic Press, New York, N.Y., vol. 2 (1964), pp. 340–1.

JAMES E. POER, Primary Examiner

A. P. DEMERS, Assistant Examiner

U.S. Cl. X.R.

252—429, 431

UNITED STATES PATENT OFFICE
CERTIFICATE OF CORRECTION

Patent No. 3,584,020    Dated   June 8, 1971

Inventor(s)   Hartwig C. Bach

It is certified that error appears in the above-identified patent and that said Letters Patent are hereby corrected as shown below:

Column 4, line 58, Claim 1, after "palladium" insert --halides and palladium--.

Signed and sealed this 25th day of January 1972.

(SEAL)
Attest:

EDWARD M. FLETCHER, JR.　　　　　ROBERT GOTTSCHALK
Attesting Officer　　　　　　　　Commissioner of Patents